United States Patent

Dillon et al.

Patent Number: 6,000,801
Date of Patent: Dec. 14, 1999

[54] MULTI-COLOR LASER PROJECTOR FOR OPTICAL LAYUP TEMPLATE AND THE LIKE

[75] Inventors: Robert F. Dillon, Stoneham; Pierre C. Trepagnier, Medford, both of Mass.

[73] Assignee: General Scanning, Inc., Watertown, Mass.

[21] Appl. No.: 08/850,208

[22] Filed: May 2, 1997

[51] Int. Cl.⁶ .................................................. G03B 21/14
[52] U.S. Cl. ........................... 353/28; 353/122; 353/121; 364/468.01
[58] Field of Search .......................... 353/28, 122, 121; 364/468.01, 468.21, 468.25; 395/125; 359/201, 204, 202

[56] References Cited

U.S. PATENT DOCUMENTS

| | | | |
|---|---|---|---|
| 2,543,561 | 2/1951 | Tracy | 88/24 |
| 3,053,144 | 9/1962 | Harries et al. | 88/24 |
| 3,377,915 | 4/1968 | Buckett | 88/24 |
| 3,749,485 | 7/1973 | Carter et al. | 353/62 |
| 4,520,261 | 5/1985 | Tsutsumi | 250/203 R |
| 4,532,402 | 7/1985 | Overbeck | 219/121 LU |
| 4,590,654 | 5/1986 | Kajiura | 29/407 |
| 4,618,759 | 10/1986 | Muller et al. | 219/121 LR |
| 4,713,537 | 12/1987 | Kunz et al. | 250/227 |
| 4,814,800 | 3/1989 | Lavisnsky et al. | 353/50 |
| 4,918,284 | 4/1990 | Weisz | 219/121.78 |
| 4,941,082 | 7/1990 | Pailthorp et al. | 364/167.01 |
| 5,011,282 | 4/1991 | Ream et al. | 356/153 |
| 5,124,524 | 6/1992 | Schuster et al. | 219/121.78 |
| 5,171,963 | 12/1992 | Saruta et al. | 219/121.69 |
| 5,195,451 | 3/1993 | Nakashima | 353/28 |
| 5,341,183 | 8/1994 | Dorsey-Palmateer | 353/122 |
| 5,381,258 | 1/1995 | Bordignon et al. | 359/202 |
| 5,400,132 | 3/1995 | Trepagnier | 356/138 |
| 5,430,662 | 7/1995 | Ahonen | 364/512 |
| 5,444,505 | 8/1995 | Dorsey-Palmateer | 353/28 |
| 5,450,147 | 9/1995 | Dorsey-Palmateer | 353/28 |
| 5,506,641 | 4/1996 | Dorsey-Palmateer | 353/28 |
| 5,588,216 | 12/1996 | Rank et al. | 33/286 |
| 5,646,859 | 7/1997 | Petta et al. | 364/468.01 |
| 5,757,647 | 5/1998 | DeMichele | 364/468.01 |

OTHER PUBLICATIONS

Blake, Scott, "Laser Guidance for Hand Laid Composites: Past, Present & Future," Compsites '97 Manufacturing and Tooling Conference and Exhibits (Jan. 20–22, 1997).

General Scanning Inc. brochure, "Laser Alignment and Measuring Systems".

Assembly Guidance Systems, Inc. brochure, "Laserguide Process Control System".

Murphy, "Software stretches laser artists' imagination," Laser Focus World (Dec. 1996).

DeMeis, "ILDA honors artist talent and laser–systems versatility," Laser Focus World (Jan. 1997).

*Primary Examiner*—William Dowling
*Attorney, Agent, or Firm*—Fish & Richardson P.C.

[57] ABSTRACT

A system that projects a multi-color laser beam image based on assembly or alignment data of a manufacturing process onto a work surface. The system provides, for example, an optical layup template in manufacturing processes, especially the layup of composite laminates. In various implementations additional important features are shown. A plurality of lasers emit beams of different colors, including colors different from that emitted by any one laser. In certain implementations, the system comprises a red and a green laser adapted to emit red, green and yellow laser beams. Software to control the system is also disclosed.

27 Claims, 6 Drawing Sheets

MULTI-COLOR LASER PROJECTOR FOR OPTICAL LAYUP TEMPLATE AND THE LIKE

BACKGROUND OF THE INVENTION

1. Field of Invention

This invention relates to rapidly-scanned laser systems that utilize a data set to project a precise image onto a precisely located region of a work surface.

Although the laser beam illuminates only one spot at a time, it moves so rapidly that an entire image on the surface becomes apparent to the eye.

The work surface upon which the image is projected may be a forming mold, a mandrel, or a completed or partially completed work piece. The image is used to provide an assembly and alignment aid for objects to be positioned on the work surface or for other activities to be performed on or in relation to the surface upon which the image is projected.

An exemplary application is the hand layup of composite parts in the aerospace industry, such as wings and engine nacelles. Another exemplary application is the projection of outlines of large roof trusses. Numerous other applications are possible.

2. Prior Art

U.S. Pat. Nos. 5,341,183, 5,400,132, 5,444,505, 5,450,147 and 5,506,641 all relate to a rapidly-scanned laser projection system utilizing a three-dimensional data set projected onto a contoured surface. These laser projection systems are referred to as "Optical Layup Templates" (OLTs). They envision a single laser with fixed wavelength (see e.g. U.S. Pat. No. 5,506,641, col. 1 line 33).

U.S. Pat. No. 5,430,662 refers to a laser positioning system for roof truss manufacturing. In this application each projector is envisioned as having a single Helium-Neon laser.

Early OLT laser projection systems utilized red Helium-Neon (HeNe) lasers because of their low cost and long, dependable life. Out of laser safety considerations, and the risk of inadvertent ocular exposure of workers to the laser beam, the laser output power, however, has been limited to less than what would otherwise be desirable for easy viewing in high ambient lighting. Color research indicates that the human eye is most sensitive to light in the yellow-green region. Several manufacturers have therefore offered OLT devices with a choice to the buyer of having either a green or a red laser installed at the factory.

In the different field of laser light shows, multi-color beams are often produced by a gas laser that lases at several lines simultaneously. These lines are separated and controlled individually by acousto-optic modulators (AOMs), that enable multichromatic projected renderings. The projections are used for entertainment purposes and are not precisely related to features of surfaces upon which the beam projects. Other laser arrangements may also be employed.

SUMMARY OF THE INVENTION

According to the present invention, multi-colored lasers are employed that launch beams along a common optical path to supply enhanced alignment or assembly information upon a work surface, and/or to provide better visibility on work surfaces of differing materials.

In another aspect the present invention provides precision laser assembly and alignment aids that employ multiple colors to improve visibility or to convey fabrication information to production personnel.

It has been recognized that perceived brightness of a projected laser line is highly variable, depending on factors such as the materials upon which the beam is projected, the type of ambient lighting (e.g. fluorescent or sodium vapor) and subjective tastes of production personnel. Customers previously faced with compromising visibility in certain circumstances, or buying different projectors with different color lasers, thus incurring additional expense, are, by the present invention, enabled to meet the various needs with a single instrument.

The present invention employs a laser assembly in an OLT laser projector that can change colors "on the fly", rather than as a factory-installed option. If workers find that a red line is more visible on some surfaces (e.g. woven graphite), or a green line is more visible on others, the same projector is constructed, upon request or based on detected features, or predetermined programming, to change instantly from red to green to accommodate this fact.

According to another feature of the invention, a system is provided that employs differing colors to convey different process information to assist production personnel. Many optical layup template laser projection systems have the ability to project text or symbols onto the layup surface for the purpose of giving additional information to production personnel. However, text projections are very burdensome to the system, because of the additional scanning time necessary to project the letters making up the text. Projection of text can thus cause the entire projected pattern to flicker annoyingly. In certain cases the text messages are not visible over the entire projection field. With a multi-color projector according to the invention, color information efficiently conveys information that might have been conveyed by projected text with disadvantageous flicker, by inconvenient auxiliary instructions not part of the image, or by other means that have drawbacks. For instance, in the field of hand layup of composite parts, according to the invention, different ply pieces (for example, sheet-form, tape-form and honeycomb pieces) within a single ply layer are readily differentiated by being projected in different colors; in another case, the outermost boundary is projected in a different color from that of interior cutouts. Another example employs change of the color of the projected boundary of each ply piece as it is laid down, to permit easy verification that ply pieces in a complicated layup have not been inadvertently skipped.

The invention also enables projected lines to be differentiated by visual effects such as by dashed lines, segments of alternating colors, or blinking effects, as well as by color alone.

We now summarize important aspects of the invention.

According to one aspect of the invention a laser projection system is provided to project a laser beam to trace images based on assembly or alignment data of a manufacturing process onto a work surface. The system comprises sources of laser light of different colors associated with a control system arranged to project images of light of selected different colors.

Certain implementations of this aspect of the invention have one or more of the following features.

The control system of the laser projection system is adapted to cause a selected color to communicate collateral information to assist in a manufacturing process. The laser projection system preferably includes a plurality of lasers adapted to emit beams of respectively different colors.

Preferably, at least two of the laser beams are adapted to trace an image in such a manner that the eye perceives a third color.

In certain preferred implementations, at least two of the laser beams of the laser projection system are adapted to rapidly alternate in tracing an image so that the eye perceives a third color. Preferably, the system includes a control for the relative duty cycle of the two lasers for affecting the quality of the perceived third color.

In other implementations, the system is adapted to trace dashed lines. Preferably, the system is adapted to trace segments of alternating colors. Preferably, the system is adapted to trace blinking features.

In certain preferred implementations, a first laser is adapted to emit a red laser beam and a second laser is adapted to emit a green laser beam so that the perceived third color is yellow. Preferably, the first laser is a red diode laser, and the second laser is a diode-pumped solid-state laser. Preferably, the system includes an acousto-optic modulator adapted to act as an electronic shutter for the green laser.

Preferred implementations of the laser projection system include a plurality of fiducial points disposed on a work surface, each having a known position in space. The fiducial points precisely define in space the location of the laser projection system relative to the work surface. Preferably, the system includes a forming tool having a plurality of fiducial points disposed on its work surface to enable the precise projection of an image onto the tool.

In certain preferred implementations, the projection system includes a multiplicity of optical deflection devices adapted to direct the laser beam. Preferably, the system includes a multiplicity of galvanometers adapted to precisely position the optical deflection devices.

In another preferred implementation, the system includes a control system operative in response to data representing three-dimensional computer aided design (CAD) drawings.

In another implementation, the laser projection system is combined with a composite material production system to produce parts comprising a multiplicity of composite plies.

According to another aspect of the invention a laser projection system is provided to project a laser beam to trace images based on assembly or alignment data of a manufacturing process onto a work surface, the system comprising a red diode laser and a green diode-pumped solid state laser, an acousto-optic modulator adapted to act as an electronic shutter for the green laser, and a forming tool having a plurality of fiducial points disposed over its work surface, each having a known position in space. The fiducial points precisely define in space the location of the laser projection system relative to the tool to enable the precise projection of the image onto the tool.

According to another aspect of the invention a method for manufacturing a part comprising a multiplicity of layered material includes employing the laser projection system to project alignment and assembly information for the layup of the material. Preferably, the method is adapted to produce composite materials. Preferably, the method is adapted for the layup of composite laminates and includes projecting the outline as a line of distinctive character, in one color, of a ply to be laid down. Upon the commencement of laying down a ply, changing the projected outline to a line of different color or character to indicate the layup process for the ply is occurring, and aligning the ply with the outline. Upon the completion of the layup of the ply, changing the color or character of the outline to a different value from that used above. Finally, returning to the beginning of the process for each additional ply to be laid down.

According to another aspect of the invention a method for laying up composite laminates made from a multiplicity of plies includes: reading a data set to enable the projection of an image of a ply onto a work surface; setting the data set to indicate a new ply to be laid down; instructing the projection system to project an image as a line of distinctive character, in one color, of the new ply to be laid down; setting the data set to indicate the layup process is occurring upon the commencement of laying down the ply; instructing the projection system to project the image of the ply as a line of a different color or character; setting the data set to indicate the layup process for the ply is finished upon the completion of laying down the ply; instructing the projection system to project the image of the ply as a line of a color or character different from that used above. And to the beginning of the process for each additional ply to be laid down having image information residing in data set.

According to another aspect of the invention, a computer program is provided that resides on a computer readable medium. The program includes the instructions to: read a data set to enable the projection of an image of a ply onto a work surface; set the data set to indicate a new ply to be laid down; instruct the projection system to project an image as a line of distinctive character, in one color, of the new ply to be laid down; set the data set to indicate the layup process has begun upon the commencement of laying down the ply; instruct the projection system to project the image of the ply as a line of a different color or character; set the data set to indicate the layup process for the ply is finished upon the completion of laying down the ply; instruct the projection system to project the image of the ply as a line of a color or character different from that used above; and return to the beginning of the program for each additional ply to be laid down having image information residing in the data set.

DESCRIPTION OF PREFERRED EMBODIMENTS

An important exemplary embodiment of the invention is in the aerospace industry, where composite parts are used increasingly because of their light weight and flexibility of fabrication. Many such parts, because of their complexity, require hand layup. Although modern composite parts are designed using 3-dimensional CAD systems, the complex parts that require hand-layup, unless an OLT was used, often have had an expensive manual step in the production process: the computer definitions on CAD have been laboriously translated into full-scale hardware templates. These templates were then used to guide layup personnel in the placement of the individual plies that made up a composite part. However, a laser projection system, if capable of handling the size and complexity of the part without excessive flicker, can replace all the functions provided by hardware templates, and provide a computer-controlled link to the CAD data. It acts as an "Optical Layup Template" (OLT).

Figure 1:
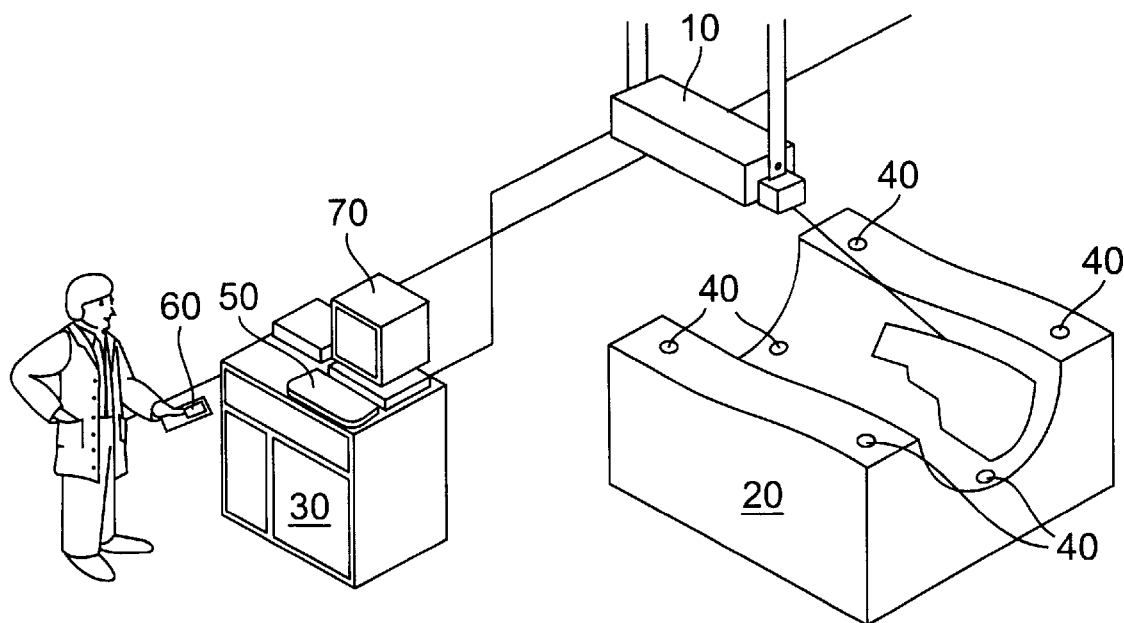
FIG. 1 is a perspective view of a multicolor optical layup template (OLT) system.

An OLT system is depicted in FIG. 1. It consists of a laser projection system 10 (having one or more projection heads) which typically mounts above the work area, the layup tool (or mandrel) 20, on to which the composite plies (for example, sheet-form, tape-form and honeycomb plies) are placed and which defines the shape of the finished part, a user interface computer 30 from which the personnel select the data set for layup, and with which they control the layup and projectors, and fiducial reference targets 40 which are placed in known positions around the work surface. These fiducial targets form the critical link between the CAD data held on the computer and the physical reality of the layup mandrel, for they are defined in the CAD coordinate system, but can be sensed by the OLT projector in its own internal angular reference system.

Figure 1A:
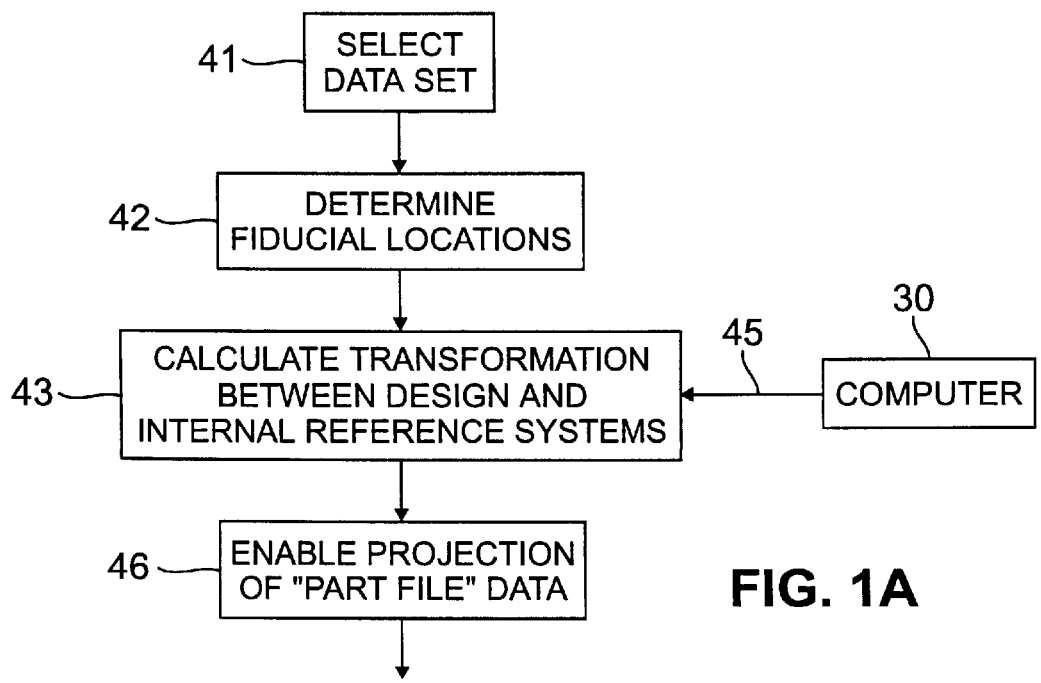
FIG. 1A is a flow diagram illustrating the calibration sequence for the OLT system.

Typically, layup personnel log themselves onto the system. As shown in FIG. 1A, they select the data set 41 ("part file") corresponding to the part they plan on laying up from the library on the user interface computer. They then perform a calibration on each projector by having it find the fiducial reference targets 40. Since the fiducial reference targets are known in the design coordinate system, when the OLT projectors locate them in the projectors, own internal reference system, a transformation 43 is calculated between the OLT system 44 and the design system 45 provided by computer 30, allowing the "part file" to be accurately projected 46 onto the layup surface in the CAD reference system.

The boundary of each composite ply is then projected directly onto the layup surface via the OLT projector 10, appearing as a laser line which serves as a guide to the placement of the composite fabric. Reference and orientation marks, and explanatory text, can be projected onto the part as well as an aid for the layup personnel. The OLT projector(s) are controlled through the computer keyboard 50 or via a remote control device 60, so that operators can step through the many plies (typically hundreds) that make up a complete composite part. Because omitting or misplacing one of these hundreds of plies (many of which are very similar) will turn a part in which hundreds of thousands of dollars have been invested into scrap, elaborate software and procedural precautions are taken to try and ensure that every ply is placed where it should be. Process control notes can be displayed on the monitor 70, although it is often inconvenient for the layup personnel, who may find the monitor obscured by the position and bulk of the mandrel.

Figure 1B:
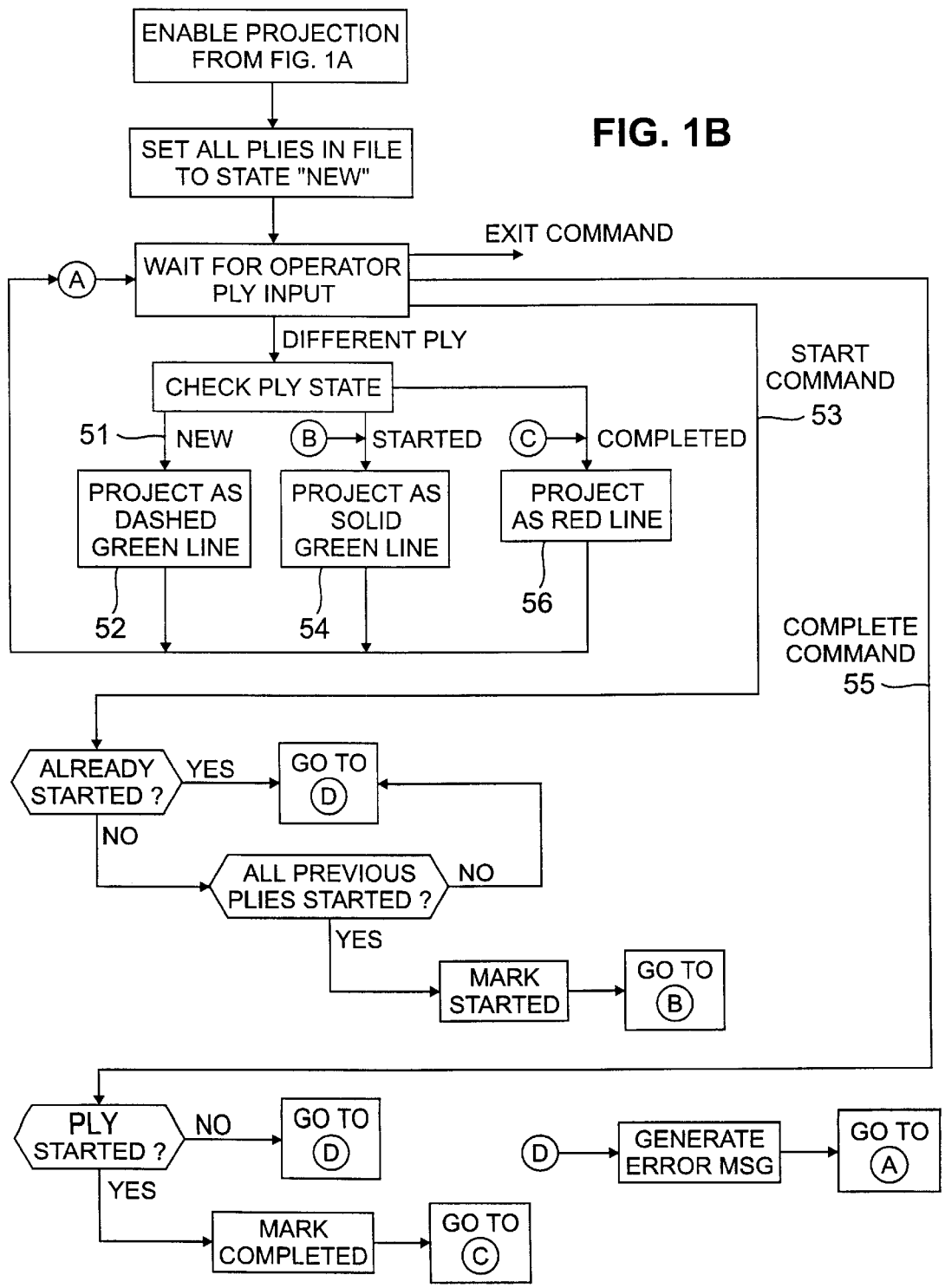
FIG. 1B is a flow diagram illustrating the process control of the layup of composite laminates.
Figure 2A:
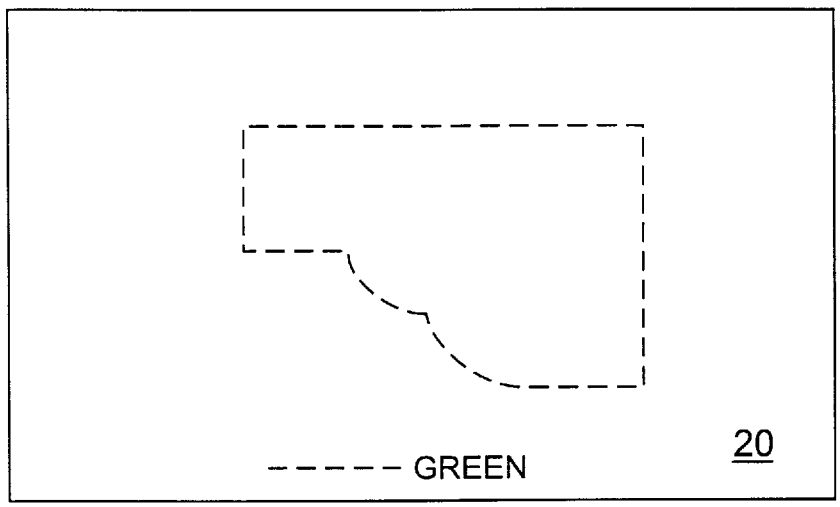
FIGS. 2A through 2C illustrate the laser projection sequence of the selected different laser line types and color during the layup of composite laminates.
Figure 2B:
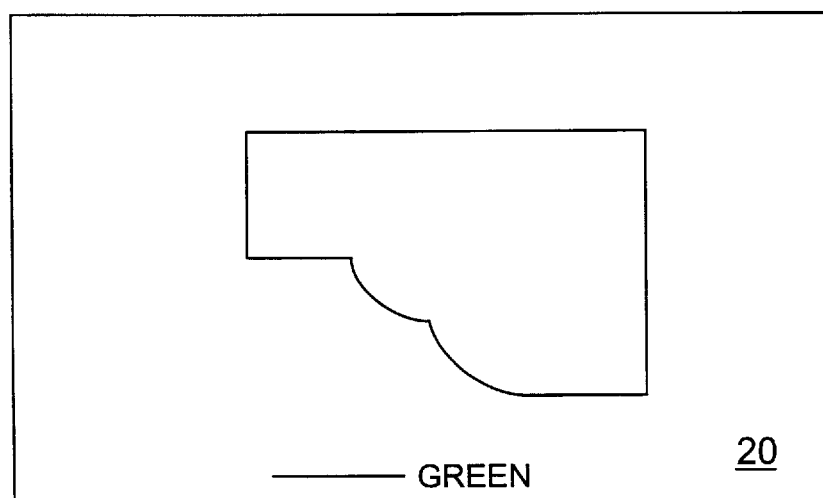
Figure 2C:
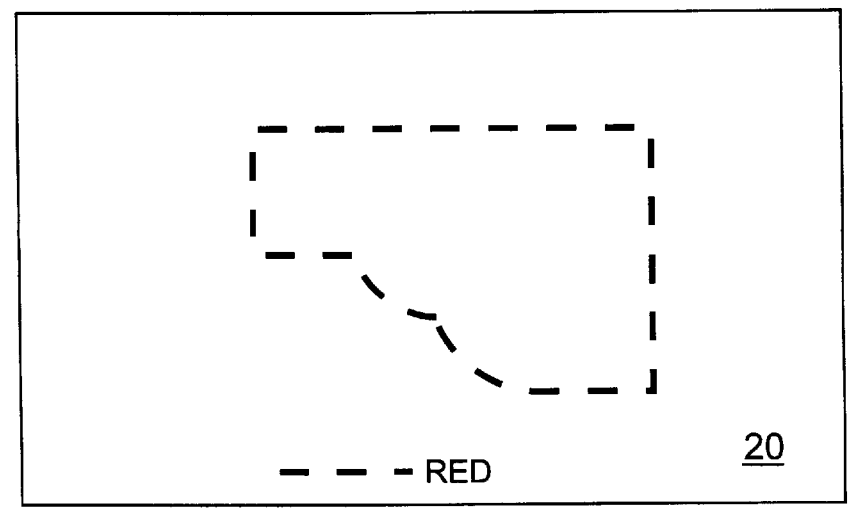

In the exemplary embodiment, additional process control is attained by having the state of the layup process encoded in the laser line, the sequence of which is illustrated in FIG. 1B (in coordination with the display sequence shown in FIGS. 2A through 2C). When a new ply is selected for the first time 51, FIG. 1B, the boundary of the ply is projected with a dashed green laser line 52, FIG. 2A. When actual layup is to begin, layup personnel signal the user interface computer 30 with a "START" command 53 via the keyboard 50 or remote control device 60, FIG. 1. The laser projection confirms the START command by switching from a dashed to a solid green laser line 54, se FIGS. 1B and 2B. When actual layup of that ply ends, layup personnel signal the user interface computer 30 with a "COMPLETE" command 55 via the keyboard 50 or remote control device 60. The laser projection confirms the COMPLETE command by switching from a green to a red laser line 56, FIG. 2C. In the course of laying up the current ply, the layup personnel will often wish to go back and check previously-laid-up plies, or forward to as-yet unlaid ones. These will appear red 56 or dashed green 52, respectively; only the current ply as it is applied will be solid green 54. Thus there is an immediate feedback as to where in the ply sequence operators are; this feedback is obtained without reference to the computer monitor 70 or auxiliary paperwork, which may be inaccessible while personnel are busy on the mandrel.

Figure 3:
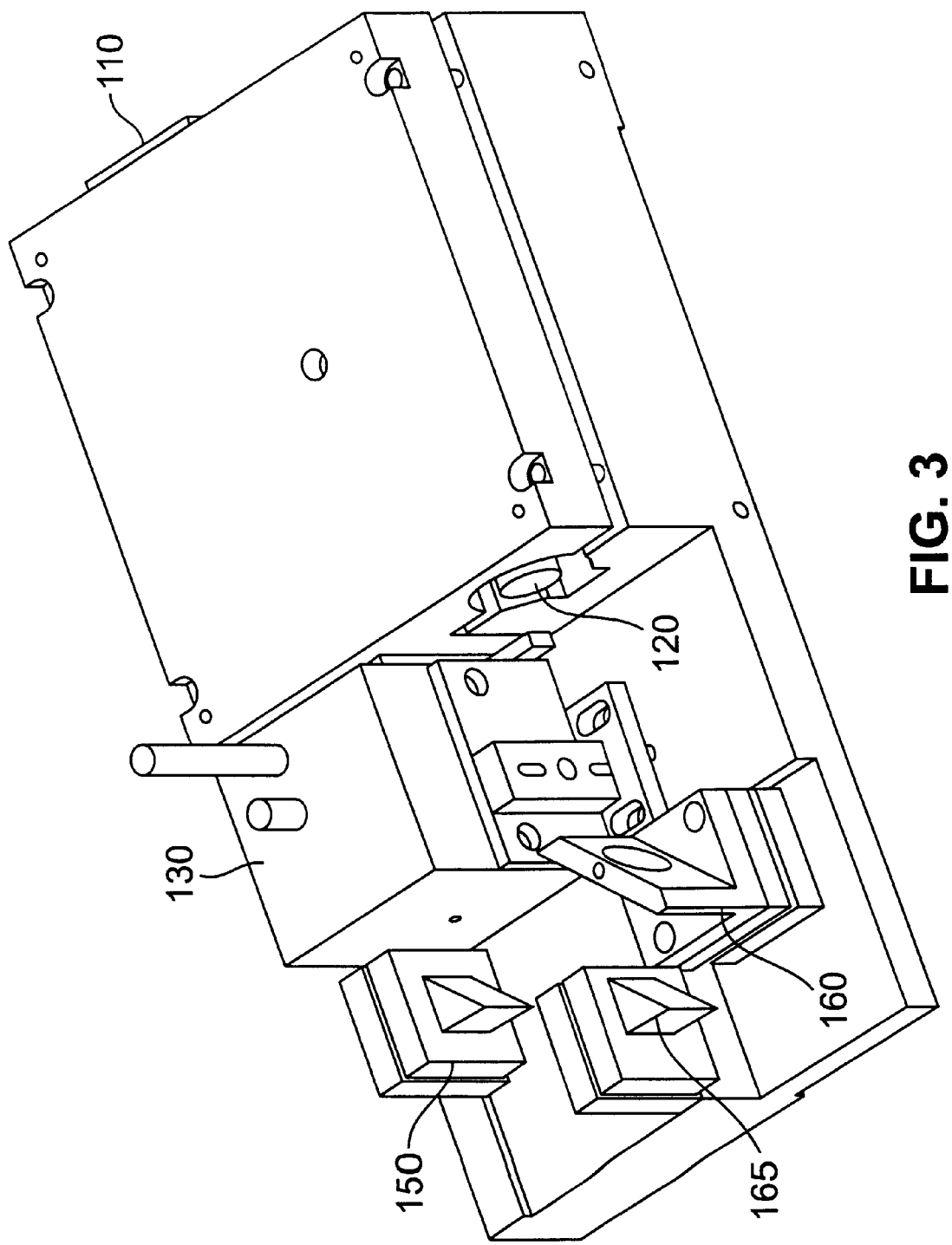
FIG. 3 is a perspective view of a tri-color OLT projector.
Figure 4:
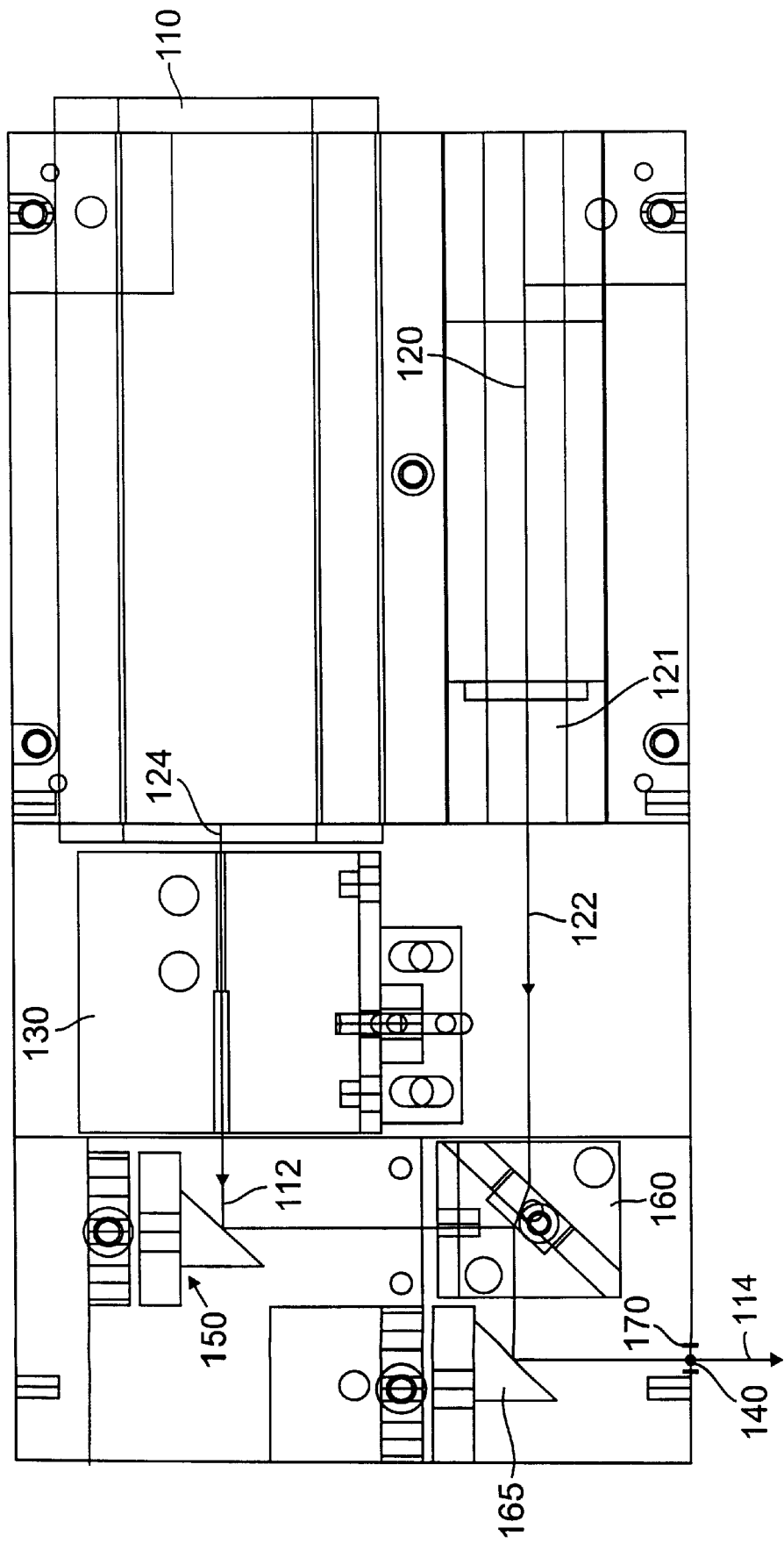
FIG. 4 is a top view of the tri-color optical layup template (OLT) projector.

Shown in FIGS. 3 and 4 is a tri-color laser projector comprising two lasers adapted to emit red, green and yellow laser beams. The green and red beams are produced by respective green and red lasers 110, 120. The yellow beam is perceived by the eye when the red and green laser beams are projected simultaneously or when they are alternated by rapid chopping.

A laser diode assembly 120 with integral beam-shaping optics 121 produces red laser light 122 with a wavelength of 635 nanometers. Such diode lasers with integrated optics are commercially available as drop-in replacements for HeNe lasers, used commonly in Optical Layup Template (OLT) projection systems. The red laser beam emitted by diode laser 120 passes unimpeded through dichroic mirror 160, is deflected by steering mirror 165, and exits the projector assembly through aperture 170 as indicated by direction arrow 114. A control input enables diode laser 120 to be switched on and off at moderate frequencies of approximately 300 kHz. The green laser beam 124 with a wavelength of 532 nanometers is emitted by a frequency-doubled diode-pumped solid-state laser (DPSS laser). In an application of the laser projector, the DPSS remains on during the entire process since it typically can not be switched on and off at frequencies similar to that of the laser diode. An acousto-optic modulator (AOM) 130 is placed in front of the DPSS laser 110 to effectively provide on/off control of the green laser beam, the AOM 130 effectively acting as an electronic shutter. The green laser beam directed at AOM 130 is split into zeroth-order and first-order beams. The first-order beam 112 is deflected 90 degrees via turn mirror 150 and is further deflected by a dichroic mirror 160 and common output steering mirror 165. It exits in the direction of arrow 114 through aperture 170. The path of the zeroth-order beam is aligned with and situated directly beneath first-order beam 112. The zeroth-order beam terminates in a beam dump 140 located below aperture 170. When a green laser beam is not desired, in response to appropriate control signals, the first-order beam is not emitted from AOM 130. This arrangement enables both red 122 and green 112 laser beams to be switched on and off independently of each other. To emit a yellow beam, laser diode 120 is turned on and first-order beam 112 is caused to pass through AOM 130. The optical arrangement combines both red 122 and green 112 laser beams into the same beam path by dichroic mirror 160 such that a yellow beam is emitted at exit aperture 170 of the laser assembly in the direction of arrow 114.

Figure 5:
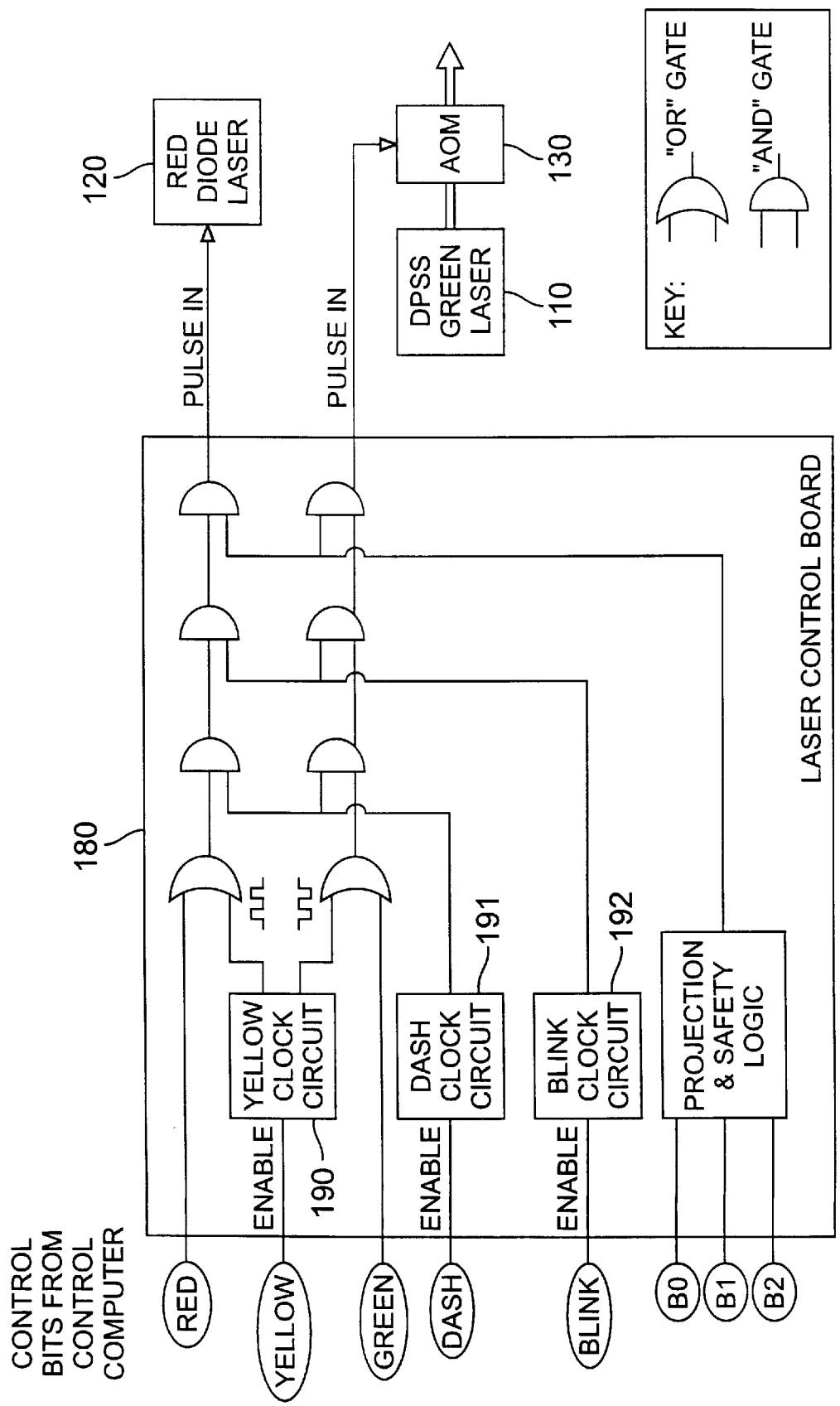
FIG. 5 is a diagrammatic view of the electronic driver for the tri-color OLT projector.

As illustrated in FIG. 5, the laser assembly is controlled by a logic board 180, which takes discrete TTL control levels from the control computer corresponding to red, yellow, green, dashed, and blinking, and in turn generates appropriate signals for the AOM 130 and diode laser 120. Yellow is produced by the yellow clock circuit 190, a dual-output circuit that alternately enables red and green laser emission at a rate of 300 kHz, so that the eye perceives yellow. The shade of yellow is determined by the selected duty cycle of the chop, that is, the percentage of time each laser, operating at a desired frequency, is turned off and on. This is preferable for laser safety reasons, for it keeps the total power output constant.

Laser light from the tri-color assembly is then directed through a beam-positioning apparatus, e.g. orthogonally-mounted galvanometers, as in a standard monochromatic OLT laser projector.

A particularly advantageous aspect of the invention is realized in the manufacturing of composite parts. For instance, during the layup process of composite parts, different ply pieces are projected in different colors, as shown in FIGS. 1B and 2A through 2C. In some layup processes, the outermost boundary of a ply being laid down (FIG. 2A) is projected in one color (for example, green) and the interior cutouts of the ply are projected as another color (for example, yellow). Also as shown in FIGS. 2A through 2C, the different colors and the visual effects such as dashed lines provided by the invention enable the easy verification that each ply piece has been properly aligned and laid down and that no ply piece has been inadvertently skipped during the layup process of a composite part. Other visual effects provided by the invention include the projection of segments of alternating colors and blinking effects, for example, by using a combination of the clock circuits 190, 191 and 192 shown in FIG. 5.

In other embodiments other types of lasers could be substituted for those in the preferred embodiment. For example, He-Ne lasers could be used, with AOMs on both beams. A particularly attractive variation would be for both lasers to be direct diode lasers. Diode lasers in the blue-green color region are lab curiosities at this time, but are forecast to be commercially available in a few years.

What is claimed is:

1. A laser projection system constructed to project a laser beam to trace images based on assembly or alignment data of a manufacturing process onto a work surface, the system comprising sources of laser light of different colors associated with a control system arranged to project images of light of selected different colors corresponding to different aspects of the manufacturing process.

2. The laser projection system of claim 1 in which the control system is adapted to cause a selected color to communicate collateral information to assist in a manufacturing process.

3. The laser projection system of claim 1 including a plurality of lasers adapted to emit beams of respectively different colors.

4. The laser projection system of claim 3 wherein at least two of said laser beams are adapted to trace an image in the manner that the eye perceives a third color.

5. The laser projection system of claim 4 wherein at least two of said laser beams are adapted to rapidly alternate in tracing an image in the manner that the eye perceives a third color.

6. The laser projection system of claim 5 including a control for the relative duty cycle of the two lasers for affecting the quality of the perceived third color.

7. The laser projection system of claim 1, 3 or 4 wherein said system is adapted to trace dashed lines.

8. The laser projection system of claim 1, 3 or 4 wherein said system is adapted to trace segments of alternating colors.

9. The laser projection system of claim 1, 3 or 4 wherein said system is adapted to trace blinking features.

10. The laser projection system of claim 1, 3 or 4 comprising a first laser adapted to emit a red laser beam and a second laser adapted to emit a green laser beam so that the perceived third color is yellow.

11. The laser projection system of claim 10 wherein said first laser is a red diode laser.

12. The laser projection system of claim 10 wherein said second laser is a diode-pumped solid-state laser.

13. The laser projection system of claim 12 including an acousto-optic modulator adapted to act as an electronic shutter for said green laser.

14. The laser projection system of claim 1 including a plurality of fiducial points disposed on a work surface, each having a known position in space, said fiducial points precisely defining in space the location of the laser projection system relative to the work surface.

15. The laser projection system of claim 1 including a forming tool having a plurality of fiducial points disposed on its work surface, each having a known position in space, said fiducial points precisely defining in space the location of the laser projection system relative to the tool to enable the precise projection of said image onto said tool.

16. The laser projection system of claim 1 including a multiplicity of optical deflection devices adapted to direct said laser beam.

17. The laser projection system of claim 16 including a multiplicity of galvanometers adapted to precisely position said optical deflection devices.

18. The laser projection system of claim 1 including a control system operative in response to data representing three-dimensional computer aided design (CAD) drawings.

19. The laser projection system of claim 1 combined with a composite material production system to produce parts comprising a multiplicity of composite plies.

20. The laser projection system of claim 1 wherein the different aspects of the manufacturing process comprises different work surface materials.

21. The laser projection system of claim 1 wherein the different aspects of the manufacturing process comprises different assembly or alignment steps.

22. A method for manufacturing a part comprising a multiplicity of layered material, the method including the steps of:

providing a laser Projection system constructed to project a laser beam to trace images based on assembly or alignment data of a manufacturing process onto a work surface, the system comprising sources of laser light of different colors associated with a control system arranged to project images of light of selected different colors corresponding to different aspects of the manufacturing process; and employing the laser projection system to project alignment and assembly information for the layup of said layered material.

23. The method of claim 22 adapted to produce composite materials.

24. A method for laying up composite laminates made from a multiplicity of plies, the method comprising a) reading a data set to enable the projection of an image of a ply onto a work surface, b) setting said data set to indicate a new ply to be laid down, c) instructing said projection system to project an image as a line of distinctive character, in one color, of the new ply to be laid down, d) setting said data set to indicate the layup process is occurring upon the commencement of laying down said ply, e) instructing said projection system to project the image of said ply as a line of a different color or character, f) setting said data set to indicate the layup process for said ply is finished upon the completion of laying down said ply, g) instructing said projection system to project the image of said ply as a line of a color or character different from that of steps c) and e), h) returning to step a) for each additional ply to be laid down having image information residing in said data set.

25. A computer program, residing on a computer readable medium, comprising the instructions to a) read a data set to enable the projection of an image of a ply onto a work surface, b) set said data set to indicate a new ply to be laid down, c) instruct said projection system to project an image as a line of distinctive character, in one color, of the new ply to be laid down, d) set said data set to indicate the layup process has begun upon the commencement of laying down said ply, e) instruct said projection system to project the image of said ply as a line of a different color or character, f) set said data set to indicate the layup process for said ply is finished upon the completion of laying down said ply, g) instruct said projection system to project the image of said ply as a line of a color or character different from that of steps c) and e)

h) return to step a) for each additional ply to be laid down having image information residing in said data set.

26. A laser projection system constructed to project a laser beam to trace images based on assembly or alignment data of a manufacturing process onto a work surface, the system comprising a red diode laser and a green diode-pumped solid state laser, an acousto-optic modulator adapted to act as an electronic shutter for said green laser, corresponding to the assembly or alignment data of the manufacturing process, and a forming tool having a plurality of fiducial points disposed over its work surface, each having a known position in space, said fiducial points precisely defining in space the location of the laser projection system relative to the tool to enable the precise projection of said image onto said tool.

27. A method for the layup of composite laminates, including the steps of:

providing a laser projection system constructed to project a laser beam to trace images based on assembly or alignment data of a manufacturing process onto a work surface, the system comprising sources of laser light of different colors associated with a control system arranged to project images of light of selected different colors corresponding to different aspects of the manufacturing process; and employing the laser projection system to project alignment and assembly information for the layup of said layered material, comprising the steps of:

a) projecting the outline as a line of distinctive character, in one color, of a ply to be laid down, b) upon the commencement of laying down a ply, changing said projected outline to a line of different color or character to indicate the layup process for said ply is occurring, c) aligning said ply with said outline, d) upon the completion of the layup of said ply, changing the color or character of said outline to a value different from steps a) or b), e) returning to step a) for each additional ply to be laid down.

* * * * *